(12) United States Patent
Leung et al.

(10) Patent No.: US 11,824,388 B2
(45) Date of Patent: Nov. 21, 2023

(54) MECHANICAL FOOLPROOF DESIGN OF BATTERY CHARGER AND RECHARGEABLE BATTERY

(71) Applicant: GP Technology & Innovation Ltd., Hong Kong (CN)

(72) Inventors: Chun Bong Leung, Hong Kong (CN); Ping Hung Tang, Hong Kong (CN); Wei Zhang, Hong Kong (CN)

(73) Assignee: GP Technology & Innovation Ltd., Hong Kong (CN)

( * ) Notice: Subject to any disclaimer, the term of this patent is extended or adjusted under 35 U.S.C. 154(b) by 204 days.

(21) Appl. No.: 17/454,839

(22) Filed: Nov. 15, 2021

(65) Prior Publication Data
US 2023/0155404 A1    May 18, 2023

(51) Int. Cl.
*H02J 7/00* (2006.01)
*H01M 50/528* (2021.01)

(52) U.S. Cl.
CPC ......... *H02J 7/0045* (2013.01); *H01M 50/528* (2021.01); *H02J 7/00045* (2020.01)

(58) Field of Classification Search
CPC .... H02J 7/0045; H02J 7/0042; H02J 7/00045; H01M 50/528
USPC .......................................... 320/107, 110, 114
See application file for complete search history.

(56) References Cited

U.S. PATENT DOCUMENTS

| | | | | |
|---|---|---|---|---|
| 4,816,735 A | * | 3/1989 | Cook | H02J 7/0042 320/133 |
| 5,443,924 A | * | 8/1995 | Spellman | H02J 7/00047 429/167 |
| 5,606,238 A | * | 2/1997 | Spellman | H01M 10/46 429/100 |
| 6,610,941 B2 | * | 8/2003 | Pfeiffer | H02J 7/00047 200/18 |
| 7,741,807 B2 | * | 6/2010 | Satsuma | H02J 7/0042 320/112 |
| 7,884,573 B1 | * | 2/2011 | Larsen | H02J 7/0045 429/100 |

FOREIGN PATENT DOCUMENTS

CN    107994632 A    5/2018

* cited by examiner

*Primary Examiner* — Richard V Muralidar
(74) *Attorney, Agent, or Firm* — S&F/WEHRW

(57) ABSTRACT

A battery of a preselected type advantageously has a beveled edge formed between a front-end surface and a lateral surface of the battery. In a battery charger, a slot has a cap formed with an interior channel for receiving a front-end portion of the preselected-type battery. The cap has a stopping member for stopping the preselected-type battery so as to receive recharging. Advantageously, the stopping member may be shaped to complement the beveled edge for seamlessly receiving the beveled edge when the preselected-type battery is inserted into the slot. A mismatch between the stopping member and a line edge of an unaccepted-type battery causes the stopping member to block the unaccepted-type battery from reaching deeper into the channel than the preselected-type battery when the unaccepted-type battery is inserted, disconnecting a positive charging terminal from the unaccepted-type battery to avoid the charger from accidentally recharging the unaccepted-type battery.

33 Claims, 12 Drawing Sheets

V-Bevel

Compound V-Bevel

J-Bevel

Compound J-Bevel

Convex Bevel

Compound Convex Bevel

MECHANICAL FOOLPROOF DESIGN OF BATTERY CHARGER AND RECHARGEABLE BATTERY

FIELD OF THE INVENTION

The present invention relates to a rechargeable battery and a battery charger both configured with respective mechanical features for enabling the battery charger to distinguish the rechargeable battery, which is of a preselected type, against a battery of an unaccepted type such that the battery charger recharges the preselected-type battery but does not recharge the unaccepted-type battery.

BACKGROUND

There are many different kinds of rechargeable batteries and different types of battery chargers in the global market. However, different kinds of rechargeable batteries employ different materials and chemical mechanisms in discharging and recharging. Under different chemical mechanisms and materials, different recharging arrangements and operation parameters should be used by battery chargers in order to ensure that respective chemical systems used in batteries are fully and safely charged. If, however, a rechargeable battery functioned under a certain chemical system is charged by a battery charger not matched to the chemical system used in the battery, the battery may be not fully charged or may be over-charged. Both cases create application problems or safety problems.

It is desirable if the battery charger used for recharging a certain rechargeable battery is capable of distinguishing the type of chemical system used in this battery. In the art, e.g., in CN 107994632A, an electronic circuitry is usually employed in the battery charger to identify the type of chemical system used in a battery under consideration for recharging. A major drawback of this approach is that a cost of the battery charger is inevitably increased. The increased cost is not desirable if, e.g., the battery charger is a disposable one bundled with a plurality of rechargeable batteries sold to a customer, where the battery charger is dedicated for recharging the plurality of rechargeable batteries. There is a need in the art for a cost-effective technique used in a battery charger for distinguishing a battery of a preselected, permitted type against unaccepted-type batteries.

SUMMARY OF THE INVENTION

The present invention is concerned with a co-design of rechargeable battery and a battery charger where the rechargeable battery belongs to a battery type intended to be recharged by the battery charger, and the battery charger is configured to avoid recharging batteries not of this battery type.

In a first aspect of the present invention, the battery charger is provided. The battery charger comprises one or more slots. An individual slot is used for recharging a preselected-type battery after the preselected-type battery is accommodated into the individual slot. The preselected-type battery has a lateral surface and a front-end surface. An edge formed between the lateral and front-end surfaces is a beveled edge. An unaccepted-type battery is defined as the preselected-type battery with the lateral and front-end surfaces extended such that the beveled edge is replaced by a line edge.

The individual slot comprises a cap and a positive charging terminal. The cap is formed with an interior channel used for receiving a front-end portion of the preselected-type battery. The cap comprises a stopping member. Advantageously, the stopping member gradually narrows the channel along a battery-insertion direction for stopping the preselected-type battery and the unaccepted-type battery from further advancement into the channel while the beveled edge enables the preselected-type battery to go deeper into the channel than the unaccepted-type battery does, thereby enabling the battery charger to distinguish the preselected-type battery from the unaccepted-type battery. The positive charging terminal is used for providing an external voltage to a positive electrode of the preselected-type battery to recharge the preselected-type battery. The positive charging terminal is positioned in the channel to barely touch the positive electrode when the preselected-type battery is stopped by the stopping member. It follows that while the preselected-type battery is allowed to be recharged, the positive charging terminal is disconnected from the unaccepted-type battery when the unaccepted-type battery is inserted into the channel, thereby achieving a desirable result of avoiding the battery charger from accidentally recharging the unaccepted-type battery. In addition to this advantage, in case the preselected-type battery is put into the individual slot in a wrong orientation such that a back-end portion of the preselected-type battery is inserted into the channel, the stopping member blocks a negative electrode of the preselected-type battery from contacting the positive charging terminal, enhancing safety in using the battery charger.

In certain embodiments, the stopping member is shaped to complement the beveled edge such that the stopping member seamlessly receives the beveled edge when the preselected-type battery is inserted into the channel. As a result, a mismatch between the stopping member and the line edge causes the stopping member to block the unaccepted-type battery from reaching deeper into the channel than the preselected-type battery when the unaccepted-type battery is inserted into channel. It causes the positive charging terminal to be disconnected from the unaccepted-type battery to thereby avoid the battery charger from accidentally recharging the unaccepted-type battery.

In certain embodiments, the cap further comprises an interior wall defining the interior channel, and the stopping member is a portion of the interior wall.

In certain embodiments, the cap further comprises an interior wall defining the interior channel, and a portion of the interior wall is shaped to complement the front-end surface such that the preselected-type battery is mated to the cap when the preselected-type battery is inserted into the channel.

In certain embodiments, the cap further comprises an interior wall defining the interior channel, and the stopping member is a flange protruding from the interior wall.

In certain embodiments, the cap further comprises an interior wall defining the interior channel, and the stopping member is a plurality of protrusions protruding from the interior wall.

In certain embodiments, the stopping member is shaped to complement a first beveled edge formed with a V-bevel.

In certain embodiments, the stopping member is shaped to complement a second beveled edge formed with a compound V-bevel.

In certain embodiments, the stopping member is shaped to complement a third beveled edge formed with a J-bevel.

In certain embodiments, the stopping member is shaped to complement a fourth beveled edge formed with a compound J-bevel.

In certain embodiments, the stopping member is shaped to complement a fifth beveled edge formed with a convex bevel.

In certain embodiments, the stopping member is shaped to complement a sixth beveled edge formed with a compound convex bevel.

In a second aspect of the present invention, an electrical-power supplying product is provided.

The electrical-power supplying product comprises one or more batteries of a preselected type. An individual preselected-type battery comprises a lateral surface and a front-end surface. An edge formed between the lateral and front-end surfaces is a beveled edge. The electrical-power supplying product further comprises a battery charger for recharging the one or more preselected-type batteries. The last-mentioned battery charger is any of the embodiments of the battery charger as disclosed in the first aspect of the present invention.

In certain embodiments, the beveled edge of the individual preselected-type battery is a first beveled edge formed with a V-bevel. Optionally, the stopping member of the cap of the individual slot is shaped to complement the first beveled edge.

In certain embodiments, the beveled edge of the individual preselected-type battery is a second beveled edge formed with a compound V-bevel. Optionally, the stopping member of the cap of the individual slot is shaped to complement the second beveled edge.

In certain embodiments, the beveled edge of the individual preselected-type battery is a third beveled edge formed with a J-bevel. Optionally, the stopping member of the cap of the individual slot is shaped to complement the third beveled edge.

In certain embodiments, the beveled edge of the individual preselected-type battery is a fourth beveled edge formed with a compound J-bevel. Optionally, the stopping member of the cap of the individual slot is shaped to complement the fourth beveled edge.

In certain embodiments, the beveled edge of the individual preselected-type battery is a fifth beveled edge formed with a convex bevel. Optionally, the stopping member of the cap of the individual slot is shaped to complement the fifth beveled edge.

In certain embodiments, the beveled edge of the individual preselected-type battery is a sixth beveled edge formed with a compound convex bevel. Optionally, the stopping member of the cap of the individual slot is shaped to complement the sixth beveled edge.

In certain embodiments, the cap of the individual slot further comprises an interior wall defining the interior channel. A portion of the interior wall is shaped to complement the front-end surface of the individual preselected-type battery such that when a respective preselected-type battery is inserted into the channel of the cap of the individual slot, the respective preselected-type battery is mated to the cap of the individual slot.

In certain embodiments, the stopping member of the cap of the individual slot is shaped to complement and fully cover the beveled edge. In addition, the beveled edge of the individual preselected-type battery has a height selected to be greater than a height of a positive electrode of the individual preselected-type battery for additionally allowing foolproof use of the battery charger by an end user.

In certain embodiments, the individual preselected-type battery further comprises: a rechargeable raw cell having a cylindrical shape; and a circuit board including an electronic circuit electrically connected to the raw cell for providing electrical protection to the individual preselected-type battery.

In certain embodiments, the electronic circuit is configured to provide a voltage step-down function during discharge of the raw cell.

In certain embodiments, the electronic circuit is further configured to provide over-charge or over-discharge protection to the raw cell.

In certain embodiments, the electronic circuit includes a light-emitting diode (LED) for signaling that the raw cell is under recharging.

In certain embodiments, the individual preselected-type battery further comprises a plastic cover for providing protection to the electronic circuit, the plastic cover being formed with the beveled edge.

In certain embodiments, the individual preselected-type battery further comprises: a metal electrode cap electrically connected to the circuit board for forming a positive electrode of the individual preselected-type battery; and a metal support ring between the raw cell and the circuit board for securely fixing the circuit board and the metal electrode cap at desired locations inside the individual preselected-type battery.

In certain embodiments, the circuit board is integrated with a wire and a metal pad for connecting the electronic circuit to a positive terminal of the raw cell, and the electronic circuit is electrically connected to a negative terminal of the raw cell through the metal support ring.

In certain embodiments, the electronic circuit includes a LED for signaling that the raw cell is under recharging, and the metal support ring is formed with one or more openings for allowing LED light generated from the electronic circuit to leave the individual preselected-type battery. Optionally, the individual preselected-type battery further comprises a plastic cover for providing protection to the electronic circuit, the plastic cover being transparent or semi-transparent for allowing LED light to leave the individual preselected-type battery.

In certain embodiments, the individual preselected-type battery further comprises an insulation tap ring partially covering the metal electrode cap for avoiding splashing water from going inside the individual preselected-type battery.

In certain embodiments, the individual preselected-type battery further comprises a plastic cover for providing protection to the electronic circuit, the plastic cover being formed with the beveled edge. In addition, the metal support ring includes one or more slot features for locking with the plastic cover, and the plastic cover includes one or more locking features for locking with the metal support ring.

In certain embodiments, the individual preselected-type battery further comprises a plastic label formed by a shrinkable sleeve for laterally covering the individual preselected-type battery.

In a third aspect of the present invention, a rechargeable battery is provided.

The battery comprises a lateral surface and a front-end surface. An edge formed between the lateral and front-end surfaces is a beveled edge. The beveled edge is recognizable as the preselected-type battery by the battery charger disclosed in the first aspect of the present invention, enabling the battery charger to recharge the battery.

In certain embodiments, the battery further comprises: a rechargeable raw cell having a cylindrical shape; and a circuit board including an electronic circuit electrically connected to the raw cell for providing electrical protection to the battery.

In certain embodiments, the electronic circuit is configured to provide a voltage step-down function during discharge of the raw cell.

In certain embodiments, the electronic circuit is further configured to provide over-charge or over-discharge protection to the raw cell.

In certain embodiments, the electronic circuit includes a LED for signaling that the raw cell is under recharging.

In certain embodiments, the battery further comprises a plastic cover for providing protection to the electronic circuit, the plastic cover being formed with the beveled edge.

In certain embodiments, the battery further comprises: a metal electrode cap electrically connected to the circuit board for forming a positive electrode of the battery; and a metal support ring between the raw cell and the circuit board for securely fixing the circuit board and the metal electrode cap at desired locations inside the battery.

In certain embodiments, the circuit board is integrated with a wire and a metal pad for connecting the electronic circuit to a positive terminal of the raw cell, and the electronic circuit is electrically connected to a negative terminal of the raw cell through the metal support ring.

In certain embodiments, the electronic circuit includes a LED for signaling that the raw cell is under recharging, and the metal support ring is formed with one or more openings for allowing LED light generated from the electronic circuit to leave the battery. Optionally, the battery further comprises a plastic cover for providing protection to the electronic circuit, the plastic cover being transparent or semi-transparent for allowing LED light to leave the battery.

In certain embodiments, the battery further comprises an insulation tap ring partially covering the metal electrode cap for avoiding splashing water from going inside the battery.

In certain embodiments, the battery further comprises a plastic cover for providing protection to the electronic circuit, the plastic cover being formed with the beveled edge. In addition, the metal support ring includes one or more slot features for locking with the plastic cover, and the plastic cover includes one or more locking features for locking with the metal support ring.

In certain embodiments, the battery further comprises a plastic label formed by a shrinkable sleeve for laterally covering the battery.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

As used herein, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

The following terms are used herein in the specification and appended claims. "An edge" of an object is a line or an elongated strip joining two non-parallel surfaces of the object. The edge may have a negligible width or a noticeable width. "A line edge" is an edge having a negligible width. In practice, a line edge formed by bending a metal sheet is usually a curvature having a small radius (e.g., ~0.2 mm). For the purpose of determining a line edge, the aforementioned negligible width may be upper-bounded by 0.8 mm, assuming a 0.5 mm radius of curvature and an angle of 90° between the two non-parallel surfaces. "A beveled edge" is an edge formed by two non-parallel surfaces of an object and realized as an elongated strip having a strip surface, where the strip surface is distinguishable from, and is comparatively smaller than, the two non-parallel surfaces. Note that the strip surface, i.e. the beveled edge itself, forms a transition between the two non-parallel surfaces. Usually, the strip surface does not make a right angle with any one of the two non-parallel surfaces. In one common form, the beveled edge has a flat strip surface and is realized as a chamfered edge from a carpenter's viewpoint.

Figure 1:
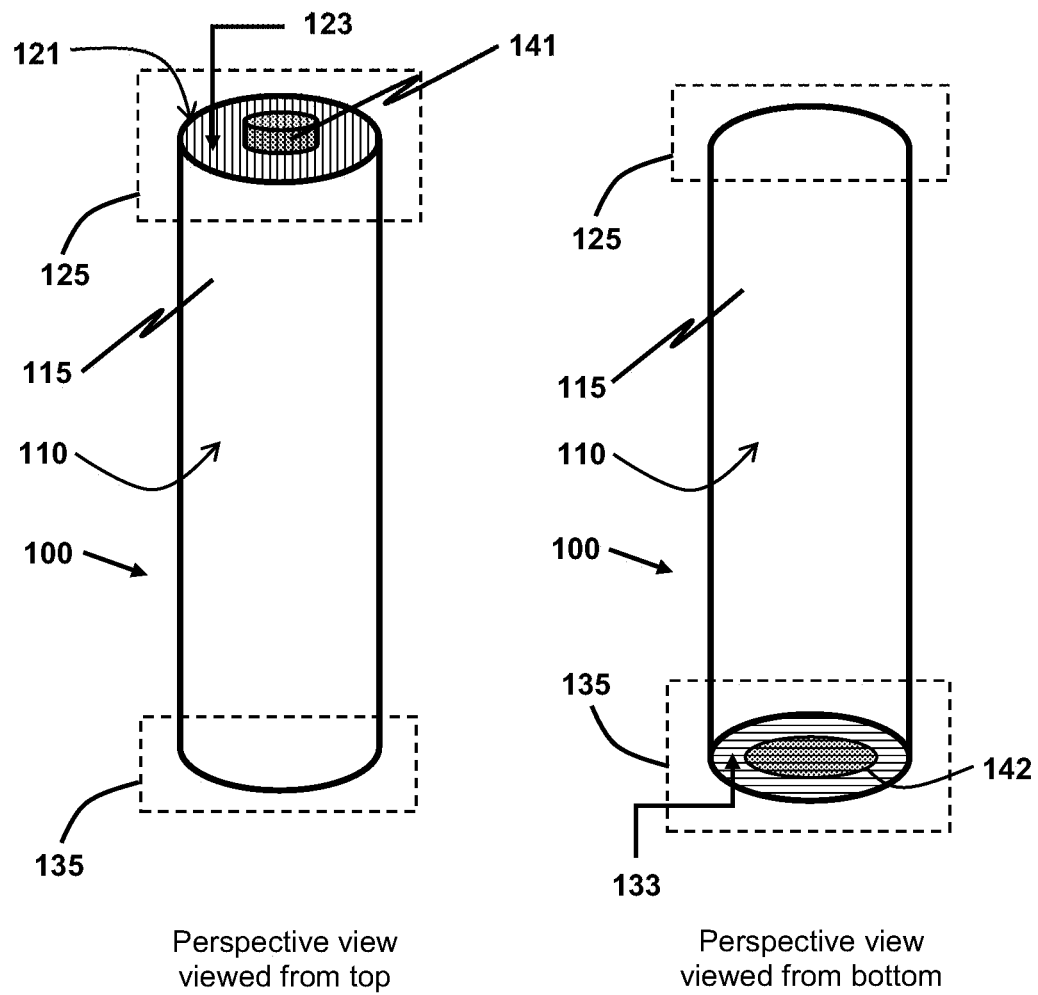
FIG. 1 depicts, for illustrative purposes, a typical cylindrically-shaped battery shown in a first perspective view viewed from the top and a second perspective view viewed from the bottom.

Technical terms used herein for describing various parts of a battery are illustrated in this paragraph with the aid of FIG. 1, which depicts a typical battery 100 shown in a first perspective view viewed from the top and a second perspective view viewed from the bottom. The battery 100 has "a positive electrode" 141, "a negative electrode" 142, and "an elongated body" 115. The elongated body 115 is usually substantially-cylindrical in shape. The elongated body 115 has "a front end" 123 and "a back end" 133, where the positive electrode 141 resides on the front end 123 and the negative electrode 142 resides on the back end 133. Furthermore, the front end 123 includes the positive electrode 141, and the back end 133 includes the negative electrode 142. "A front-end surface" 120 is a surface of the front end 123. "A back-end surface" 130 is a surface of the back end 133. Note that the front-end surface 120 includes a surface of the positive electrode 141, and the back-end surface 130 includes a surface of the negative electrode 142. Denote "a front-end portion" 125 of the battery 100 as a portion of the elongated body 115 adjacent to, and including, the front end 123. Denote "a back-end portion" 135 of the battery 100 as a portion of the elongated body 115 adjacent to, and including, the back end 133. Between the front end 123 and the back end 133 there is "a lateral surface" 110 on the elongated body 115. An edge 121 is formed between the lateral surface 110 and the front end 123. Typically, the edge 121 is a line edge, which has a negligible width so that the edge 121 forms a sharp corner in the front-end portion 125. However, the present invention is not limited only to the case that the edge 121 is a line edge; the edge 121 may have a non-negligible width.

The present invention provides a co-design of a rechargeable battery and a battery charger where the rechargeable battery belongs to a battery type intended to be recharged by the battery charger, and the battery charger avoids itself from recharging batteries not of this battery type. Denote the battery type intended to be recharged by the battery charger as "a preselected type". Hence, the aforementioned rechargeable battery is "a battery of a preselected type" or "a preselected-type battery." Denote a battery that the battery charger avoids to recharge as "a battery of an unaccepted type" or "an unaccepted-type battery."

The Inventors notice that in reducing a cost of manufacturing the battery charger while enabling the battery charger to distinguish different types of rechargeable batteries and recharge only batteries of a preselected type, a mechanical arrangement is more preferable than an electronic means in checking if a battery received by the battery charger is a preselected-type battery. Furthermore, the mechanical arrangement is required to be simple and foolproof because an end user actually handles the operational procedure of using the battery charger to recharge batteries.

Figure 2:
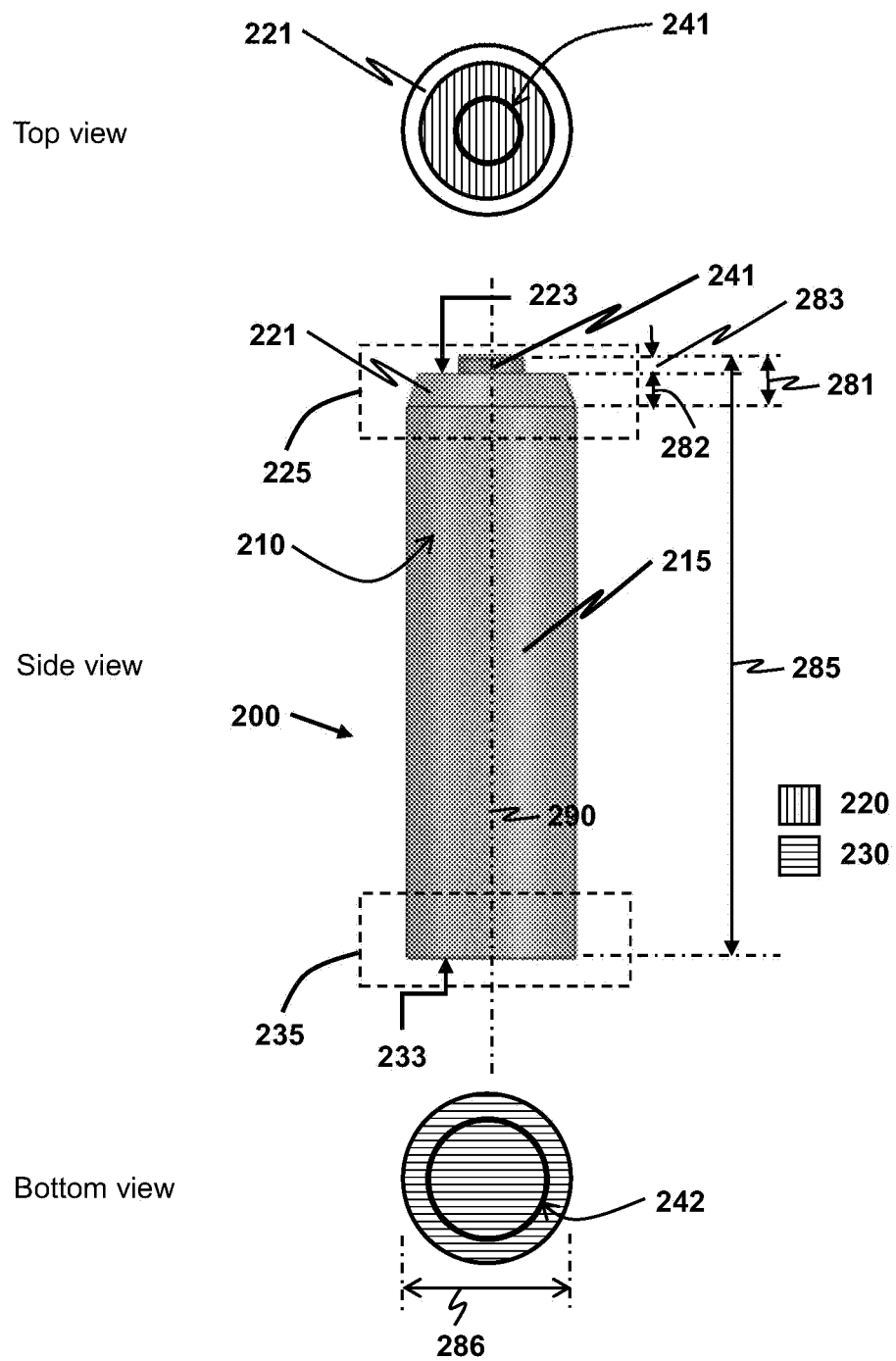
FIG. 2 depicts a preselected-type battery comprising a mechanical feature, which is a beveled edge, recognizable by a battery charger such that the battery charger is activated to recharge the preselected-type battery.
Figure 3:
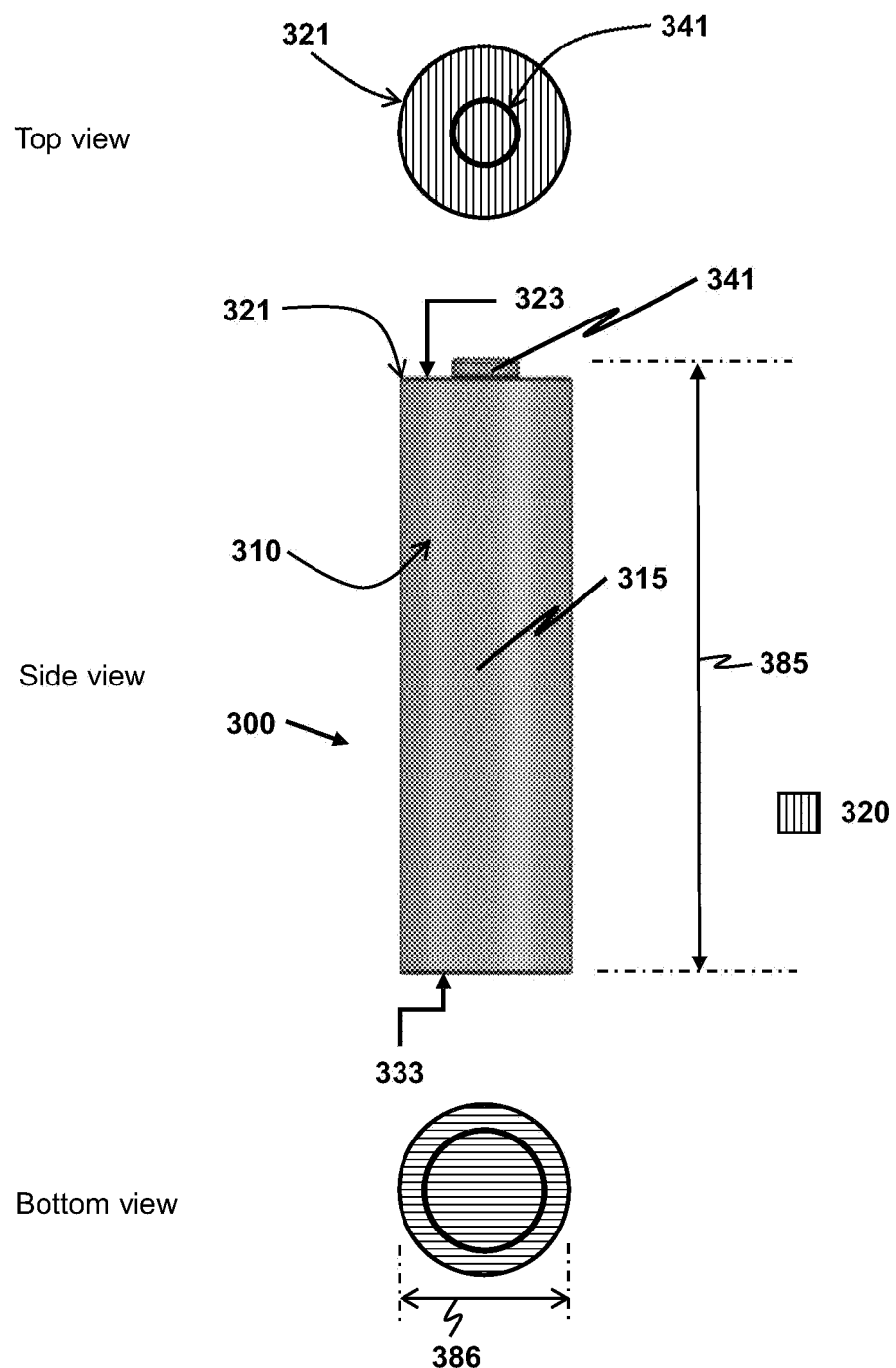
FIG. 3 depicts an unaccepted-type battery not having the aforementioned mechanical feature such that the battery charger is not activated to recharge the unaccepted-type battery.

Exemplarily, FIG. 2 depicts a preselected-type battery 200 comprising a mechanical feature recognizable by a battery charger for triggering or activating the battery charger to recharge the preselected-type battery 200. For comparison, FIG. 3 depicts an unaccepted-type battery 300, which does not have the aforementioned mechanical feature such that the battery charger is not activated to recharge the unaccepted-type battery 300.

The preselected-type battery 200 comprises a lateral surface 210, a front-end surface 220, and an edge 221 formed between the lateral surface 210 and the front-end surface 220. Specifically, the edge 221 is formed as a beveled edge 221. As will be explained later, the beveled edge 221 is advantageously used as the aforementioned mechanical feature for enabling the battery charger to distinguish the preselected-type battery from the unaccepted-type battery 300. For the purpose of forthcoming illustration of the disclosed battery charger, it is mentioned that generally the preselected-type battery 200 further comprises a positive electrode 241, a negative electrode 242, an elongated body 215, a front end 223, a back end 233, a front-end surface 220, a back-end surface 230, a front-end portion 225 and a back-end portion 235. The elongated body 215 has a major axis 290.

The unaccepted-type battery 300 is defined as the preselected-type battery 200 with the lateral surface 210 and front-end surface 220 extended such that the beveled edge 221 is replaced by a line edge. Particularly, the lateral surface 210 is extended along a direction of the major axis 290 to meet the front-end surface 220 that is extended along a radial direction perpendicular to the major axis 290. That is, in the unaccepted-type battery 300, an edge 321 formed by a lateral surface 310 and a front-end surface 320 is a line edge 321 while the preselected-type battery 200 and the unaccepted-type battery 300 are kept the same in height and width. A height 285 of the preselected-type battery 200 is a distance between the front end 223 (or the positive electrode 241) and the back end 233 of the preselected-type battery 200. A height 385 of the unaccepted-type battery 300 is a distance between a front end 323 (or a positive electrode 341) and a back end 333 of the unaccepted-type battery 300. A width 286 of the preselected-type battery 200 is a width of the elongated body 215 of the preselected-type battery 200. A width 386 of the unaccepted-type battery 300 is a width of an elongated body 315 of the unaccepted-type battery 300. Note that the unaccepted-type battery 300 resembles a commercially-available cylindrically-shaped battery compliant to published standards put forth by International Electrotechnical Commission, such as an AA-size battery.

Figure 4:
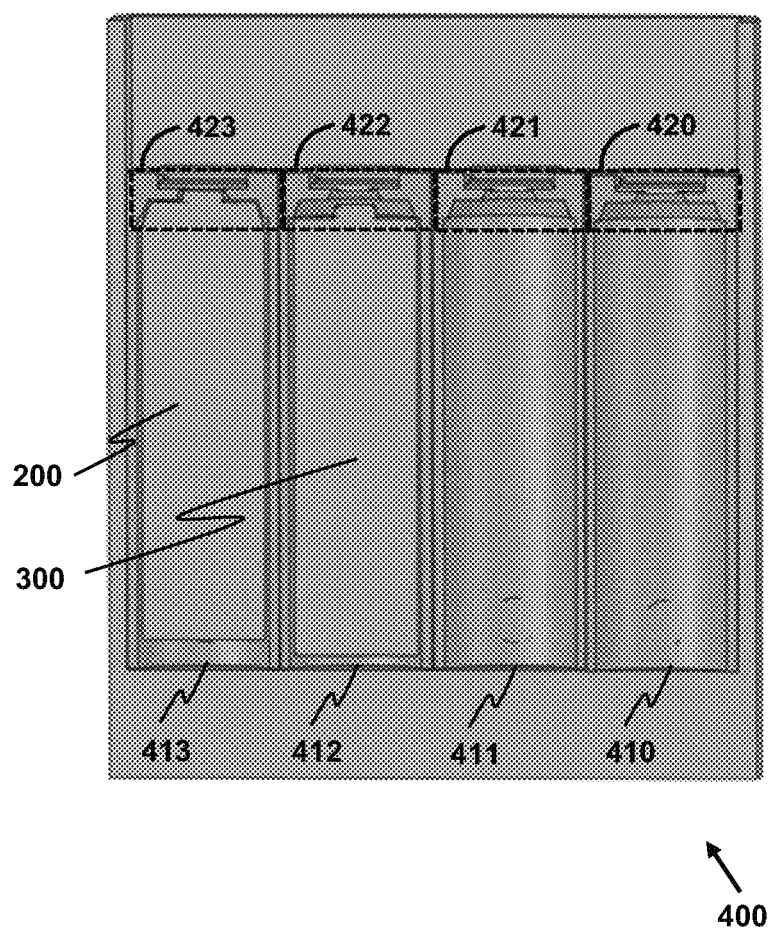
FIG. 4 depicts, in accordance with an exemplary embodiment of the present invention, a battery charger for recognizing and thereby recharging the preselected-type battery while disallowing the unaccepted-type battery to be recharged by the battery charger.

FIG. 4 depicts an exemplary battery charger 400 for recognizing the beveled edge 221 of the preselected-type battery 200 and hence recharging the preselected-type battery 200 while disallowing the unaccepted-type battery 300 from being recharged by the battery charger 400.

The battery charger 400 comprises one or more slots 410-413. Although FIG. 4 depicts that four slots are used in the battery charger 400 as a particular case for illustration, the present invention is not limited only to this number of slots in implementing the battery charger 400; the battery charger 400 may be installed with any positive number of slot(s). An individual slot (i.e. any one of the slots 410-413) is used for recharging the preselected-type battery 200 after the preselected-type battery 200 is accommodated into the individual slot. The individual slot is installed with a cap for receiving a front-end portion of a battery that is inserted to the individual slot. The slots 410-413 are installed with respective caps 420-423, respectively. In implementation of the battery charger 400, the respective caps 420-423 may be realized as physically separate components, or more commonly, may collectively be manufactured as one integrated unit composed of the respective caps 420-423.

Figure 5:
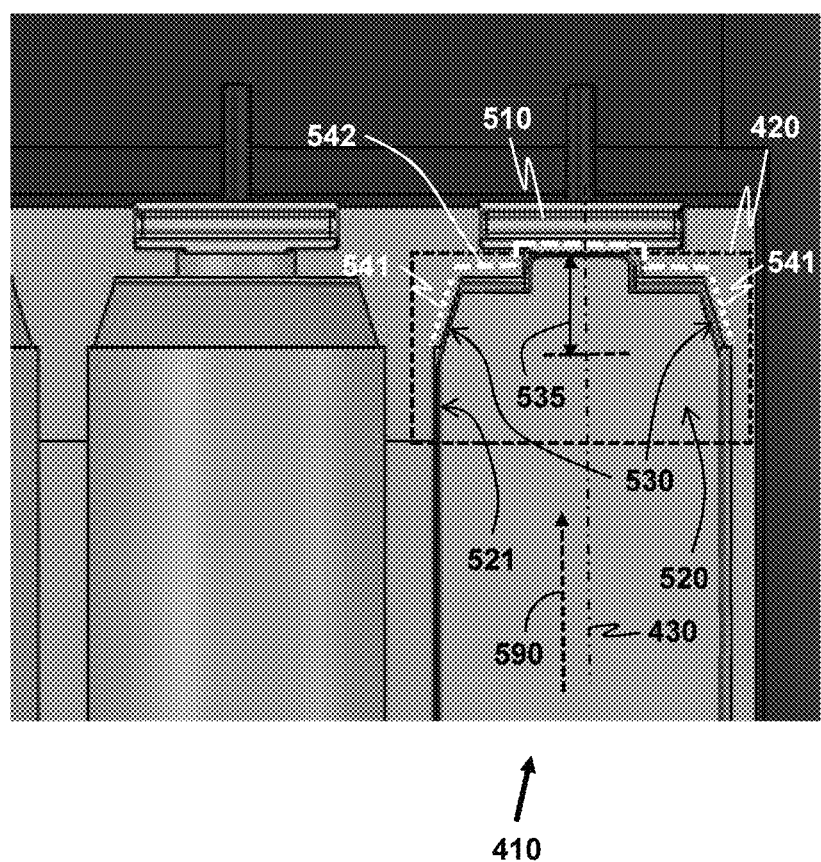
FIG. 5 depicts an enlarged view of the battery charger around a cap installed in a slot of the battery charger, where the cap is installed with a mechanical arrangement, which is a stopping member, for distinguishing the preselected-type battery against the unaccepted-type battery.

Without loss of generality, consider the slot 410 as a representative slot for illustrating operating principles of the battery charger 400. FIG. 5 depicts an enlarged view of the battery charger 400 around the cap 420 of the slot 410. The cap 420 is formed with an interior channel 520 used for receiving the front-end portion 225 of the preselected-type battery 200. The preselected-type battery 200, or any other battery such as the unaccepted-type battery 300, is inserted into the channel 520 along a battery-insertion direction 590. The cap 420 comprises a stopping member 530. Particularly, the stopping member 530 gradually narrows the channel 520 along the battery-insertion direction 590 for stopping the preselected-type battery 200 and the unaccepted-type battery 300 from further advancement into the channel 520. In practice, the stopping member 530 is also used for stopping any battery received by the slot 410 where the battery is similar to the preselected-type battery 200 in size. As a particular advantage of gradually narrowing the channel 520 along the battery-insertion direction 590, the beveled edge 221 enables the preselected-type battery 200 to go deeper into the channel 520 than the unaccepted-type battery 300, thereby enabling the battery charger 400 to distinguish the preselected-type battery 200 from the unaccepted-type battery 300. Note that by "gradually narrowing the channel 520," abrupt narrowing the channel 520 by a step change at a certain location of the channel 520 is excluded. The presence of the step change may block both the preselected- and unaccepted-type batteries 200, 300 at the aforementioned certain location of the channel 520. The slot 410 is further installed with a positive charging terminal 510 for providing an external voltage to the positive electrode 241 of the preselected-type battery 200 in order to recharge the preselected-type battery 200. (The external voltage is usually a positive voltage with respect to a reference voltage at the negative electrode 242 of the preselected-type battery 200.) In particular, the positive charging terminal 510 is positioned in the channel 520 to barely touch the positive electrode 241 when the preselected-type battery 200 is stopped by the stopping member 530 during the preselected-type battery 200 advancing into the channel 520. As used herein, "barely touch" means "only just touch". The combination of this positional arrangement of the positive charging terminal 510 and the different depths of penetration into the channel 520 by the preselected- and unaccepted-type batteries 200, 300 gives rise to the following advantage. While the preselected-type battery 200 is allowed to be recharged by connecting to the positive charging terminal 510, the positive charging terminal 510 is disconnected from the unaccepted-type battery 300 when the unaccepted-type battery 300 is inserted into the channel 520, thereby avoiding the battery charger 400 from accidentally recharging the unaccepted-type battery 300.

As one form of gradually narrowing the channel 520 along the battery-insertion direction 590, the stopping member 530 is shaped to complement the beveled edge 221 (as shown in FIG. 2) such that the stopping member 530 seamlessly receives the beveled edge 221 when the preselected-type battery 200 is inserted into the channel 520. By shaping the stopping member 530 to complement the beveled edge 221, it is meant that a first surface of the stopping member 530 intended to contact a second surface of the beveled edge 221 has a surface profile complementary to a surface profile of the second surface such that when the beveled edge 221 is received and contacted by the stopping member 530, an empty space formed between the first and second surfaces is substantially vanished. The stopping member 530 may be further configured to fully, or partially, cover the beveled edge 221 when the preselected-type battery 200 is stopped by the stopping member 530. Furthermore, positioning the positive charging terminal 510 to barely touch the positive electrode 241 upon the preselected-type battery 200 being stopped by the stopping member 530 is achievable by judiciously setting a distance 535 measured along a major axis 430 of the slot 410 between the positive charging terminal 510 and the stopping member 530. The distance 535 is required to be the same as a corresponding distance 281 between the positive electrode 241 and the beveled edge 221 of the preselected-type battery 200 (see FIG. 2). Note that the corresponding distance 281 is measured along the major axis 290 of the elongated body 215. As a result of the above-mentioned arrangement on shaping the stopping member 530 and positioning the positive charging terminal 510, a mismatch between the stopping member 530 and the line edge 321 of the unaccepted-type battery 300 causes the stopping member 530 to block the unaccepted-type battery 300 from reaching deeper into the channel 520 than the preselected-type battery 200 does when the unaccepted-type battery 300 is inserted into channel 520. It causes the positive charging terminal 510 to be disconnected from the unaccepted-type battery 300, thereby avoiding the battery charger 400 from accidentally recharging the unaccepted-type battery 300.

Figure 12:
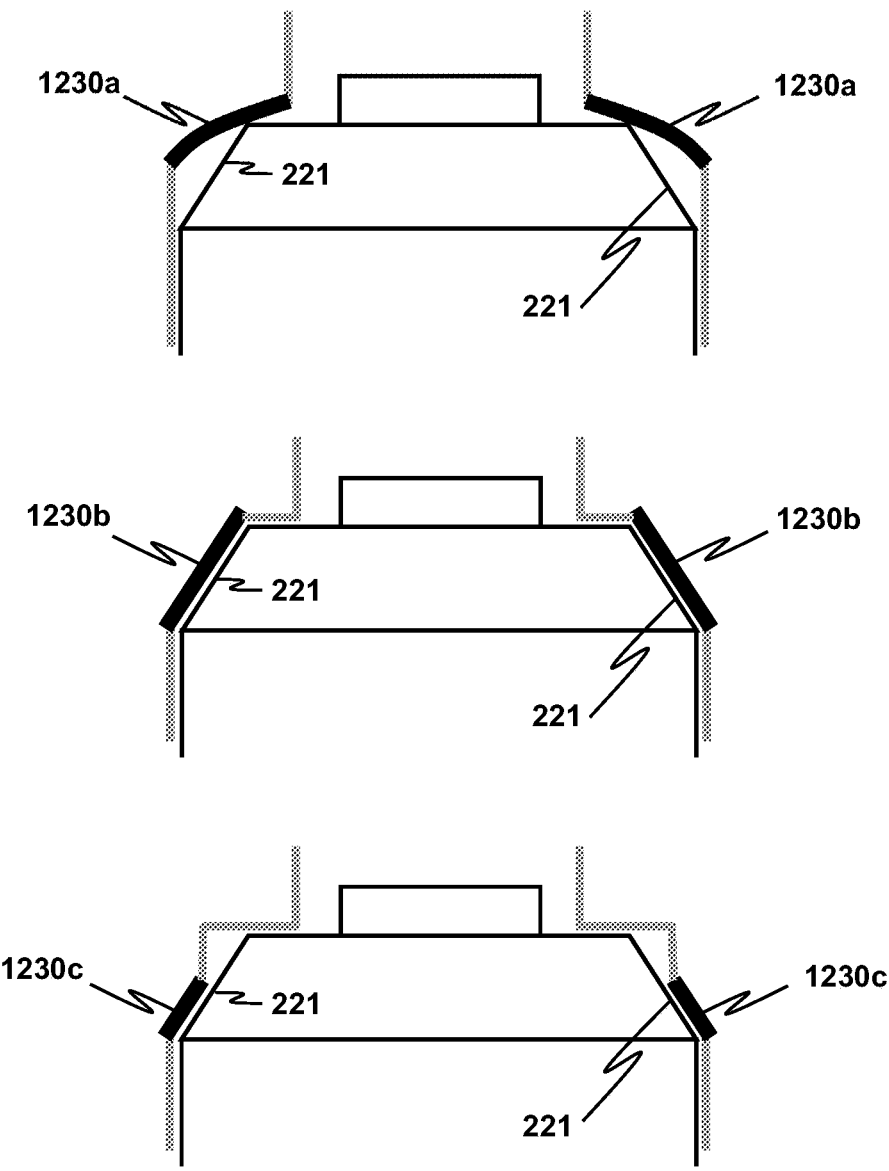
FIG. 12 plots cross-section diagrams depicting examples of the stopping member for illustrating three different configurations of the stopping member.

FIG. 12 plots cross-section diagrams depicting examples of the stopping member 530 for illustrating the three different configurations of the stopping member 530 as disclosed above. A first stopping member 1230a depicts an exemplary general configuration of the stopping member 503 that gradually narrows along the battery-insertion direction 590. A second stopping member 1230b is shaped to complement and fully cover the beveled edge 221. A third stopping member 1230c is shaped to complement the beveled edge 221 as well, but the third stopping member 1230c only partially covers the beveled edge 221.

As a demonstration, the two slots 422, 423 as shown in FIG. 4 are inserted with the unaccepted-type battery 300 and the preselected-type battery 200, respectively. It is apparent that the preselected-type battery 200 advances deeper into the interior channel of the slot 423 than the unaccepted-type battery 300 goes into the interior channel of the slot 422 because the line edge 321 of the unaccepted-type battery 300 is blocked by the stopping member of the slot 422 whereas the beveled edge 221 of the preselected-type battery 200 is well received by the stopping member of the slot 423. The positive electrode 241 of the preselected-type battery 200 is able to contact the positive charging terminal of the slot 423, allowing the battery charger 400 to recharge the preselected-type battery 200. On the other hand, the positive electrode 341 of the unaccepted-type battery 300 is unable to contact the positive charging terminal of the slot 422, preventing the battery charger 400 from recharging the unaccepted-type battery 300.

In addition to this advantage, the battery charger 400 provides another advantage of enhancing safety in using the battery charger 400 in case an end user incorrectly puts the preselected-type battery 200 into the slot 410 in a wrong orientation such that the back-end portion 235 is inserted into the channel 520. In this case, the stopping member 530 blocks the negative electrode 242 from contacting the positive charging terminal 510.

As shown in FIG. 5, the cap 420 further comprises an interior wall 521 where the interior wall 521 defines the interior channel 520.

FIG. 5 additionally depicts certain embodiments of forming the stopping member 530 in the cap 420. Preferably, the stopping member 530 is a surface formed by a first portion 541 of the interior wall 521. Furthermore, it is preferable that a second portion 542 of the interior wall 521 is shaped to complement the front-end surface 220 of the preselected-type battery 200. As a result, the preselected-type battery 200 is mated to the cap 420 when the preselected-type battery 200 is inserted into the channel 520. In general, shaping the interior wall 521 to the front-end portion 225 of the preselected-type battery 200 has the advantages that the stopping member 530 is simultaneously formed with the cap 420 in manufacturing the battery charger 400 and that the positive charging terminal 510 can be simply put on the interior wall 521 during assembling the battery charger 400.

Figure 6:
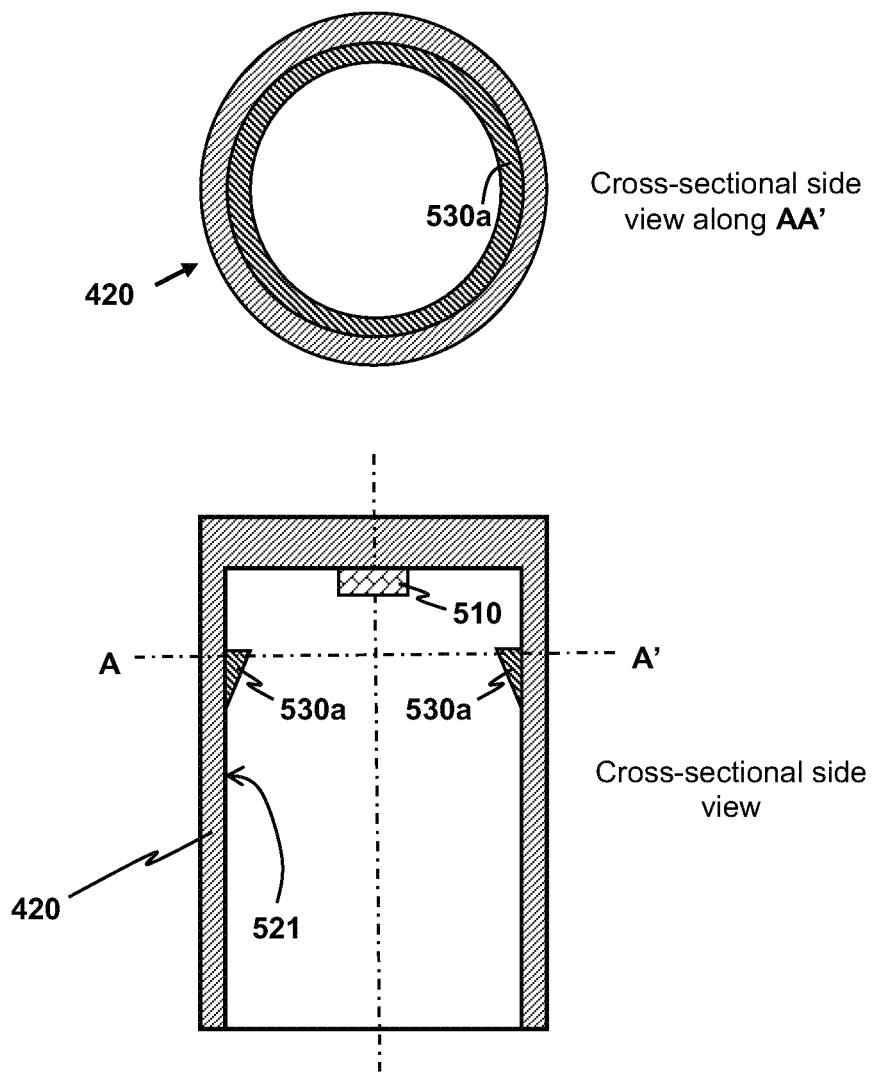
FIG. 6 depicts a first variant of the stopping member usable in the battery charger.
Figure 7:
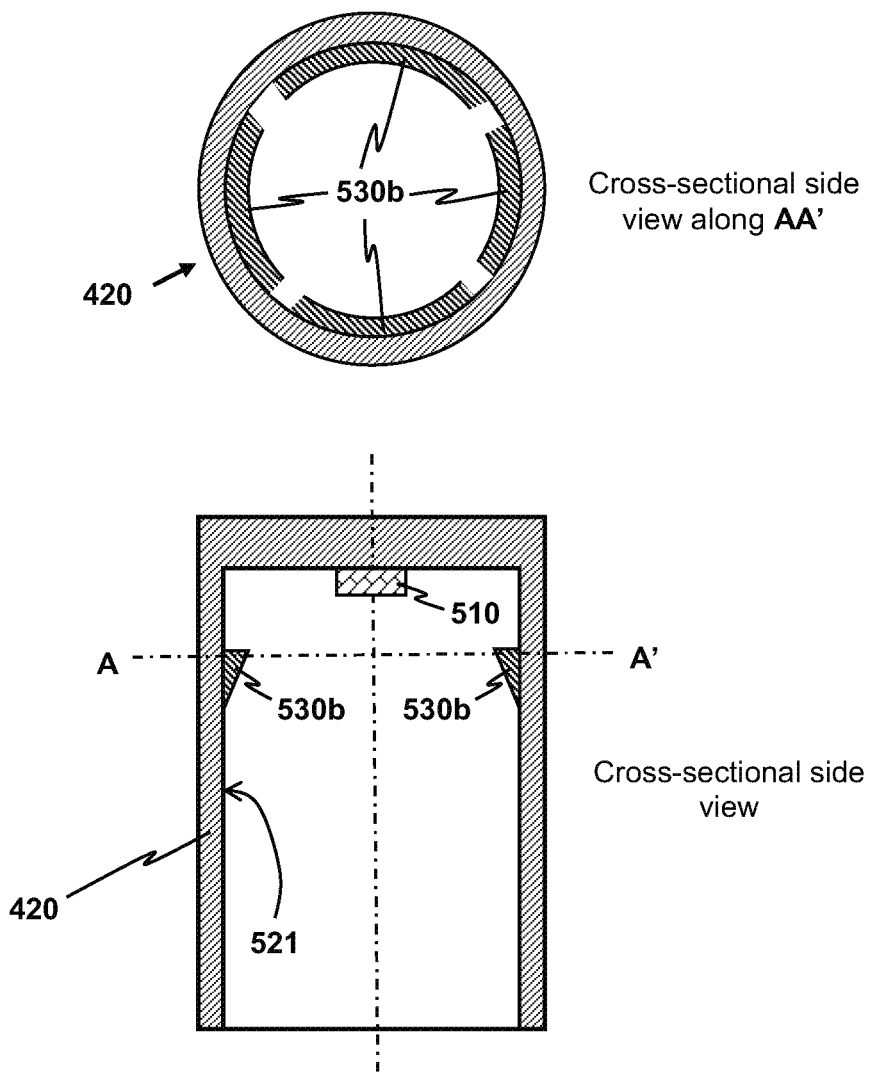
FIG. 7 depicts a second variant of the stopping member usable in the battery charger.

FIGS. 6 and 7 illustrate other embodiments of forming the stopping member 530 by depicting respective caps in cross-sectional top view and cross-sectional side view. FIG. 6 depicts the cap 420 installed with a first variant of stopping member 530a. The stopping member 530a is realized as a flange protruding from the interior wall 521. FIG. 7 depicts the cap 420 installed with a second variant of stopping member 530b. The stopping member 530b is formed as a plurality of protrusions protruding from the interior wall 521. Other variants of the stopping member 530 are also possible, and can be designed by those skilled in the art according to the teaching disclosed herein.

Figure 8:
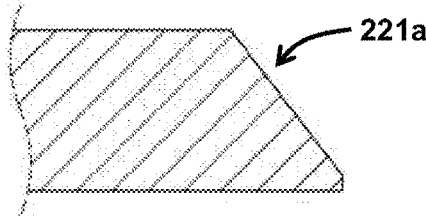
FIG. 8 depicts different shapes usable to form the beveled edge as used in designing the preselected-type battery and the battery charger.
Figure 8:
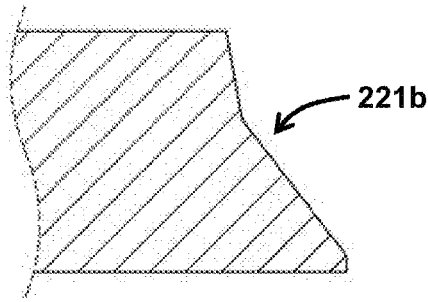
Figure 8:
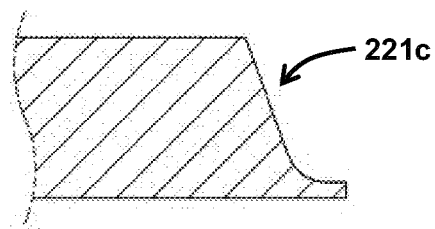
Figure 8:
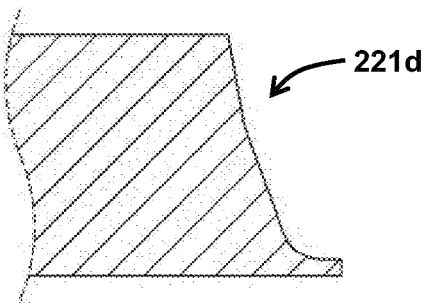
Figure 8:
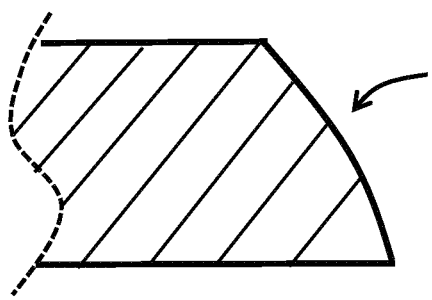
Figure 8:
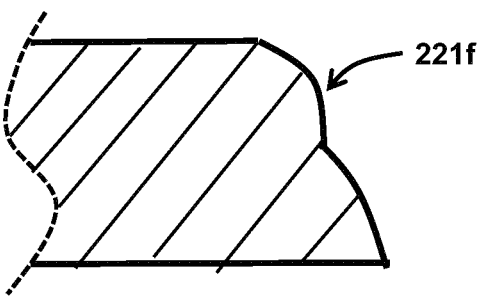

Various embodiments of the beveled edge 221 can be adopted in designing the preselected-type battery 200 as well as in designing the stopping member 530 of the battery charger 400. FIG. 8 depicts various shapes that can be used to form the beveled edge 221. In its simplest form, the beveled edge 221 may be a first beveled edge 221a formed with a V-bevel. Instead of forming the beveled edge 221 with one slope as in the V-bevel, it is possible to form the beveled edge 221 with multiple slopes. In this configuration, the beveled edge 221 may be a second beveled edge 221b formed with a compound V-bevel. Apart from V-bevel, a J-bevel may also be used. The beveled edge 221 may be a third beveled edge 221c formed with a J-bevel. The beveled edge 221 may also be a fourth beveled edge 221d formed with a compound J-bevel. Note that the J-bevel has a concave shape. Correspondingly, there is a convex bevel. The beveled edge 221 may be a fifth beveled edge 221e formed with a convex bevel. The beveled edge 221 may also be a sixth beveled edge 221f formed with a compound convex bevel. Similarly, the stopping member 530 of the battery charger 400 may be shaped to complement the first beveled edge 221a, the second beveled edge 221b, the third beveled edge 221c, the fourth beveled edge 221d, the fifth beveled edge 221e, or the sixth beveled edge 221f.

One parameter involved in the co-design of the preselected-type battery 200 and the battery charger 400 is a height 282 of the beveled edge 221. If the stopping member 530 is shaped to complement and fully cover the beveled edge 221, the beveled-edge height 282 is roughly a distance between the positive charging terminal 510 of the battery charger 400 and the positive electrode 341 of the unaccepted-type battery 300. Hence, the beveled-edge height 282 characterizes an allowable displacement measured along the major axis 430 in positioning the positive charging terminal 510 in the interior channel 520 with respect to the stopping member 530. This allowable displacement is related to manufacturing tolerance and long-term reliability of the battery charger 400. The beveled-edge height 282 may be set from 1 mm to 4 mm in general, more preferably from 2 mm to 4 mm, and even more preferably from 3 mm to 4 mm. Preferably, the beveled-edge height 282 is selected to be greater than a height 283 of the positive electrode 241 for additionally allowing foolproof use of the battery charger 400 by an end user, under the condition that the stopping member 530 is shaped to complement and fully cover the beveled edge 221. Note that the beveled-edge height 282 and the positive-electrode height 283 are measured along the major axis 290 of the elongated body 215.

The disclosed battery charger 400 offers various advantages such as reducing a manufacturing cost, being simple to use and being foolproof. By using the stopping member 530 to avoid the unaccepted-type battery 300 from being recharged while allowing the preselected-type battery 200 to be recharged, an electronic means for detecting the type of battery inserted into the slot 410 is not required, allowing the manufacturing cost of the battery charger 400 to be reduced. In operating the battery charger 400, an end user is only required to insert a battery into a slot of the battery charger 400 in an ordinary way. Whether or not the battery is of the preselected type is determined entirely by the battery charger 400, and the battery charger 400 may be programmed or configured to automatically initiate a recharging process after the battery is determined to be of the preselected type, offering convenience to the end user. The battery charger 400 is foolproof in that the battery charger 400 automatically determines whether the battery that is inserted is of the preselected type or of the unaccepted type without a need for the end user's additional involvement in the determination.

Those skilled in the art will notice that additional components are required to be implemented in the battery charger 400 for making the battery charger 400 functional, and that determination of these additional components is within the common knowledge of those skilled in the art. These additional components may be: a negative charging terminal for maintaining a negative voltage (with respect to the external voltage provided by the positive charging terminal 510) at the negative electrode 242 of the preselected-type battery 200; a clamping mechanism for securely holding the preselected-type battery 200 between the positive charging terminal 510 and the negative charging terminal; a charging circuit for providing a charging current to the preselected-type battery 200; an overcurrent protection circuit for preventing excessive current to be supplied to the preselected-type battery 200; a casing for enabling the end user to easily grasp the battery charger 400; any feature related to safety in using the battery charger 400; etc.

Note that in the presence of the beveled edge 221, the preselected-type battery 200 has a shape deviated from a conventional design of a cylindrically-shaped battery. Despite this, the unconventional shape does not necessarily require a substantial re-design of an internal structure of a standard cylindrical battery to form the preselected-type battery 200 if the preselected-type battery 200 is formed with not only one or more electric cells of standard cylindrical shape but also an electronic circuit for performing certain functions in battery management and output-current management. Advantageously, electric cells of standard cylindrical shape as manufactured in bulk quantity for conventional cylindrically-shaped batteries are reusable in the preselected-type battery 200.

One reason for including electronic circuits in practical rechargeable batteries is that a lithium-ion (Li-ion) cell provides a voltage of ~3.6V but a standard cylindrically-shaped battery (e.g., AA or AAA battery) offers a nominal voltage of 1.5V. In a rechargeable battery, an electronic circuit is therefore required for stepping down the voltage from 3.6V to 1.5V and cutting off an external voltage from electrical cells housed in the battery in case overcharging happens.

Figure 9:
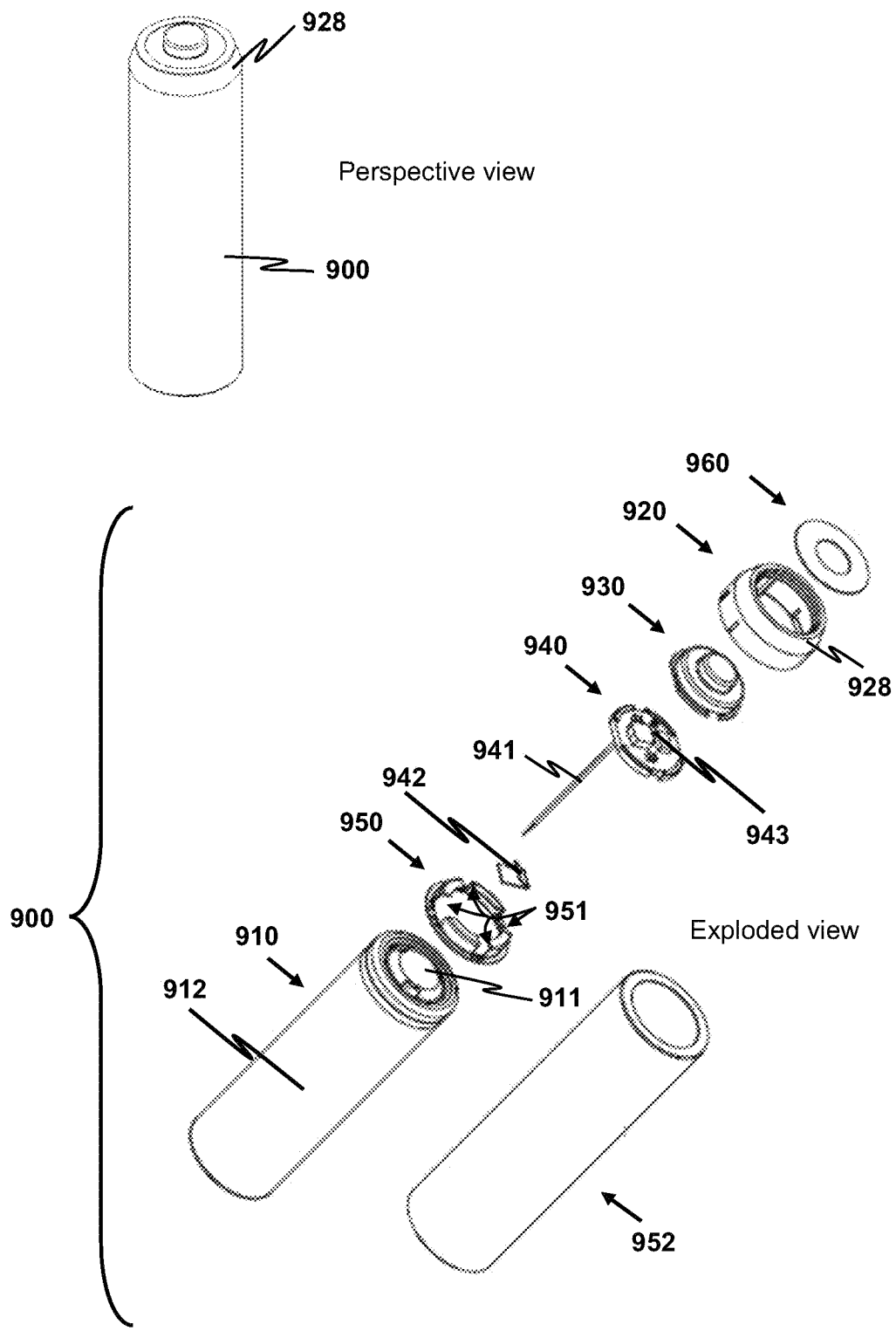
FIG. 9 depicts a rechargeable battery as one implementation of the preselected-type battery, where the rechargeable battery incorporates an electronic circuit and a rechargeable electric cell of standard cylindrical shape.

FIG. 9 depicts a rechargeable battery 900 incorporating an electronic circuit and a rechargeable electric cell of cylindrical shape, where the battery 900 represents certain embodiments of the preselected-type battery 200 and forms one implementation of the preselected-type battery 200. The battery 900 comprises: a raw cell 910 that is rechargeable; a circuit board 940 including an electronic circuit 943; a metal support ring 950 between the raw cell 910 and the circuit board 940; a metal electrode cap 930 atop the circuit board 940; an insulation tap ring 960 resting on the metal electrode cap 930; a plastic cover 920 partially covering the insulation tap ring 960 and the metal electrode cap 930; and a plastic label 952 for laterally covering the battery 900.

Note that the plastic cover 920 is formed with a beveled edge 928, a main feature for enabling the battery charger 400 to recognize that the battery 900 is of the preselected type.

The raw cell 910 has a cylindrical shape and is used for providing electrical power though discharging and for storing electrical energy during recharging. The raw cell 910 has a positive terminal 911 and a negative terminal 912. The positive terminal 911 is located at a center of a top side of the raw cell 910 whereas the negative terminal 912 covers not only a bottom side of the raw cell 910 but also a lateral side thereof. In one embodiment, the raw cell 910 is secondary Li-ion chemistry cell providing a nominal voltage of 3.2V between the positive and negative terminals 911, 912. In general, the provided voltage depends on chemical compositions of the raw cell 910.

The electronic circuit 943 installed in the circuit board 940 is used to provide electrical protection to the battery 900. Particularly, the electronic circuit 943 is electrically connected to the raw cell 910. The electronic circuit 943 may provide over-charge or over-discharge protection to the raw cell 910. The electronic circuit 943 may also provide a voltage step-down function from 3.2V to 1.5V during discharge of the raw cell 910. Optionally, the electronic circuit 943 includes a LED for signaling that the raw cell 910 is under recharging. The circuit board 940 may be integrated with a wire 941 and a metal pad 942 for connecting the electronic circuit 943 to the positive terminal 911 of the raw cell 910. In practical implementation, the wire 941 and the metal pad 942 may be different objects joined together by, e.g., soldering or welding, or may be collectively formed as a single piece of metal strip. Preferably and conveniently, the electronic circuit 943 is electrically connected to the negative terminal 912 through the metal support ring 950.

The metal electrode cap 930 forms a positive electrode of the battery 900 and is electrically connected to the circuit board 940. Preferably, the metal electrode cap 930 has a flat bottom surface for conveniently mounting the metal electrode cap 930 to the circuit board 940 during assembling the battery 900.

The metal support ring 950 provides a platform for securely fixing the circuit board 940 and the metal electrode cap 930 at desired locations inside the battery 900. The metal support ring 950 also provides an electrical connection between the negative terminal 912 of the raw cell 910 and the circuit board 943. Optionally, the metal support ring 950 is formed with one or more openings 951 for allowing LED light generated from the electronic circuit 943 to leave the battery 900.

The plastic cover 920 provides protection to the electronic circuit 943. Optionally, the plastic cover 920 is transparent or semi-transparent for allowing LED light to leave the battery 900.

The insulation tap ring 960 partially covering the metal electrode cap 930 provides a top cover to the battery 900 for avoiding splashing water from going inside the battery 900 through the top side.

The plastic label 952 for laterally covering the battery 900 may be formed by a shrinkable sleeve.

Figure 10:
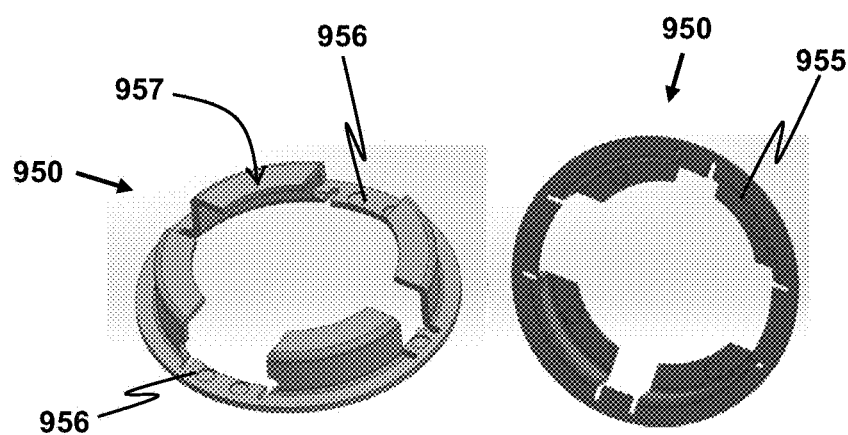
FIG. 10 depicts various views of a metal support ring for illustrating internal features thereof, where the metal support ring is used in the rechargeable battery of FIG. 9.

FIG. 10 depicts various views of the metal support ring 950 for illustrating internal features thereof. Preferably, the metal support ring 950 includes one or more slot features 956 for locking with the plastic cover 920. In one embodiment, there is a pair of slot features 956 as shown in FIG. 10. Preferably, the metal support ring 950 has a flat bottom surface 955 for allowing the metal support ring 950 to be soldered to the top of the raw cell 910. It is also preferable that the metal support ring 950 has a flat top surface 957 for facilitating the metal support ring 950 to be soldered or welded to the circuit board 940.

Figure 11:
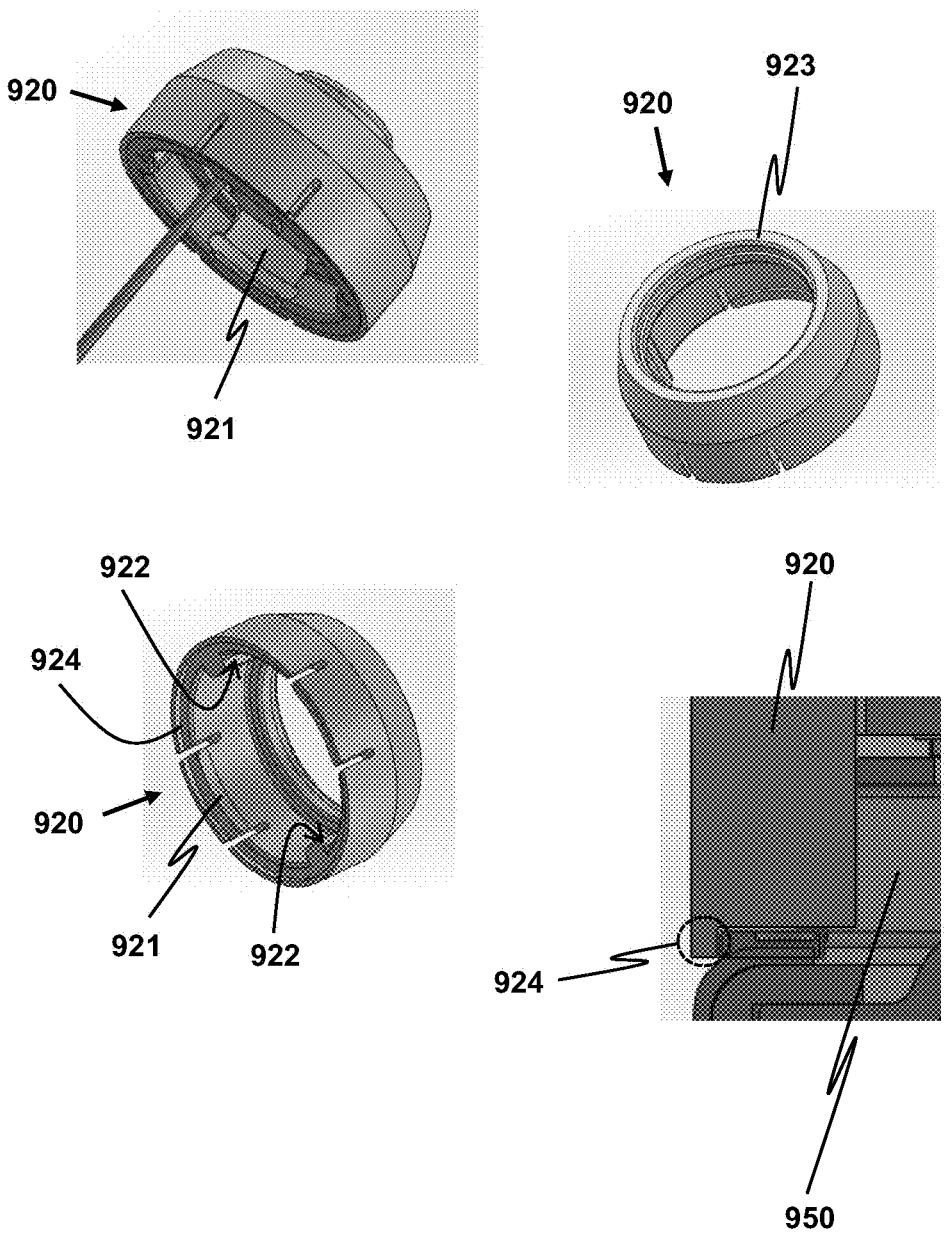
FIG. 11 depicts veracious views of a plastic cover for illustrating internal features thereof, where the plastic cover is used in the rechargeable battery of FIG. 9.

FIG. 11 depicts various views of the plastic cover 920 for illustrating internal features thereof. Preferably, the plastic cover 920 includes one or more locking features 921 for locking with the metal support ring 950. In one embodiment, there is a pair of locking features 921 as shown in FIG. 11. Preferably, the plastic cover 920 further includes one or more ribs 922 at an inner surface of the plastic cover 920 for controlling positions of components held inside the plastic cover 920. Optionally, the plastic cover 920 further includes an upper step 923 for providing a space to add a sealing glue thereon. In certain embodiments, the plastic cover 920 further includes a bottom step 924 for covering a bottom edge of the metal support ring 950.

Based on the preselected-type battery 200 and the battery charger 400 as disclosed above, an electrical-power supplying product may be formed. The product comprises one or more batteries of a preselected type, and any of the above-disclosed embodiments of the battery charger 400 for recharging the one or more preselected-type batteries. Each aforesaid preselected-type battery is an embodiment of the preselected-type battery 200 as disclosed above. The product may be formed as a package containing articles, where the articles include the battery charger 400 and the one or more batteries of the preselected type.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A battery charger comprising one or more slots, an individual slot being used for recharging a preselected-type battery after the preselected-type battery is accommodated into the individual slot, the preselected-type battery having a lateral surface and a front-end surface, an edge formed between the lateral and front-end surfaces being a beveled edge, an unaccepted-type battery being defined as the preselected-type battery with the lateral and front-end surfaces extended such that the beveled edge is replaced by a line edge, the individual slot comprising:

a cap formed with an interior channel used for receiving a front-end portion of the preselected-type battery, the cap comprising a stopping member, wherein the stopping member gradually narrows the channel along a battery-insertion direction for stopping the preselected-type battery and the unaccepted-type battery from further advancement into the channel while the beveled edge enables the preselected-type battery to go deeper into the channel than the unaccepted-type battery does to thereby enable the battery charger to distinguish the preselected-type battery from the unaccepted-type battery; and a positive charging terminal for providing an external voltage to a positive electrode of the preselected-type battery to recharge the preselected-type battery, wherein the positive charging terminal is positioned in the channel to barely touch the positive electrode when the preselected-type battery is stopped by the stopping member such that while the preselected-type battery is allowed to be recharged, the positive charging terminal is disconnected from the unaccepted-type battery when the unaccepted-type battery is inserted into the channel, thereby avoiding the battery charger from accidentally recharging the unaccepted-type battery.

2. The battery charger of claim 1, wherein the stopping member is shaped to complement the beveled edge such that the stopping member seamlessly receives the beveled edge when the preselected-type battery is inserted into the channel, whereby a mismatch between the stopping member and the line edge causes the stopping member to block the unaccepted-type battery from reaching deeper into the channel than the preselected-type battery does when the unaccepted-type battery is inserted into channel, causing the positive charging terminal to be disconnected from the unaccepted-type battery.

3. The battery charger of claim 1, wherein the cap further comprises an interior wall defining the interior channel, and the stopping member is a portion of the interior wall.

4. The battery charger of claim 1, wherein the cap further comprises an interior wall defining the interior channel, and a portion of the interior wall is shaped to complement the front-end surface such that the preselected-type battery is mated to the cap when the preselected-type battery is inserted into the channel.

5. The battery charger of claim 1, wherein the cap further comprises an interior wall defining the interior channel, and the stopping member is a flange protruding from the interior wall.

6. The battery charger of claim 1, wherein the cap further comprises an interior wall defining the interior channel, and the stopping member is a plurality of protrusions protruding from the interior wall.

7. The battery charger of claim 1, wherein the stopping member is shaped to complement a first beveled edge formed with a V-bevel.

8. The battery charger of claim 1, wherein the stopping member is shaped to complement a second beveled edge formed with a compound V-bevel.

9. The battery charger of claim 1, wherein the stopping member is shaped to complement a third beveled edge formed with a J-bevel.

10. The battery charger of claim 1, wherein the stopping member is shaped to complement a fourth beveled edge formed with a compound J-bevel.

11. The battery charger of claim 1, wherein the stopping member is shaped to complement a fifth beveled edge formed with a convex bevel.

12. The battery charger of claim 1, wherein the stopping member is shaped to complement a sixth beveled edge formed with a compound convex bevel.

13. An electrical-power supplying product comprising:
one or more batteries of a preselected type, an individual preselected-type battery comprising a lateral surface and a front-end surface, an edge formed between the lateral and front-end surfaces being a beveled edge; and
the battery charger of claim 1 for recharging the one or more preselected-type batteries.

14. The electrical-power supplying product of claim 13, wherein:
the beveled edge of the individual preselected-type battery is a first beveled edge formed with a V-bevel.

15. The electrical-power supplying product of claim 13, wherein:
the beveled edge of the individual preselected-type battery is a second beveled edge formed with a compound V-bevel.

16. The electrical-power supplying product of claim 13, wherein:
the beveled edge of the individual preselected-type battery is a third beveled edge formed with a J-bevel.

17. The electrical-power supplying product of claim 13, wherein:
the beveled edge of the individual preselected-type battery is a fourth beveled edge formed with a compound J-bevel.

18. The electrical-power supplying product of claim 13, wherein:
the beveled edge of the individual preselected-type battery is a fifth beveled edge formed with a convex bevel.

19. The electrical-power supplying product of claim 13, wherein:
the beveled edge of the individual preselected-type battery is a sixth beveled edge formed with a compound convex bevel.

20. The electrical-power supplying product of claim 13, wherein:
the cap of the individual slot further comprises an interior wall defining the interior channel; and
a portion of the interior wall is shaped to complement the front-end surface of the individual preselected-type battery such that when a respective preselected-type battery is inserted into the channel of the cap of the individual slot, the respective preselected-type battery is mated to the cap of the individual slot.

21. The electrical-power supplying product of claim 13, wherein:
the stopping member of the cap of the individual slot is shaped to complement and fully cover the beveled edge; and
the beveled edge of the individual preselected-type battery has a height selected to be greater than a height of a positive electrode of the individual preselected-type battery for additionally allowing foolproof use of the battery charger by an end user.

22. The electrical-power supplying product of claim 13, wherein the individual preselected-type battery further comprises:
a rechargeable raw cell having a cylindrical shape; and
a circuit board including an electronic circuit electrically connected to the raw cell for providing electrical protection to the battery.

23. The electrical-power supplying product of claim 22, wherein the electronic circuit is configured to provide a voltage step-down function during discharge of the raw cell.

24. The electrical-power supplying product of claim 23, wherein the electronic circuit is further configured to provide over-charge or over-discharge protection to the raw cell.

25. The electrical-power supplying product of claim 22, wherein the electronic circuit includes a light-emitting diode (LED) for signaling that the raw cell is under recharging.

26. The electrical-power supplying product of claim 22, wherein the individual preselected-type battery further comprises a plastic cover for providing protection to the electronic circuit, the plastic cover being formed with the beveled edge.

27. The electrical-power supplying product of claim 22, wherein the individual preselected-type battery further comprises:
a metal electrode cap electrically connected to the circuit board for forming a positive electrode of the individual preselected-type battery; and a metal support ring between the raw cell and the circuit board for securely fixing the circuit board and the metal electrode cap at desired locations inside the individual preselected-type battery.

28. The electrical-power supplying product of claim 27, wherein:
the circuit board is integrated with a wire and a metal pad for connecting the electronic circuit to a positive terminal of the raw cell; and
the electronic circuit is electrically connected to a negative terminal of the raw cell through the metal support ring.

29. The electrical-power supplying product of claim 27, wherein:
the electronic circuit includes a light-emitting diode (LED) for signaling that the raw cell is under recharging; and
the metal support ring is formed with one or more openings for allowing LED light generated from the electronic circuit to leave the individual preselected-type battery.

30. The electrical-power supplying product of claim 29, wherein the individual preselected-type battery further comprises a plastic cover for providing protection to the electronic circuit, the plastic cover being transparent or semi-transparent for allowing LED light to leave the individual preselected-type battery.

31. The electrical-power supplying product of claim 27, wherein the individual preselected-type battery further comprises an insulation tap ring partially covering the metal electrode cap for avoiding splashing water from going inside the individual preselected-type battery.

32. The electrical-power supplying product of claim 27, wherein:
the individual preselected-type battery further comprises a plastic cover for providing protection to the electronic circuit, the plastic cover being formed with the beveled edge;
the metal support ring includes one or more slot features for locking with the plastic cover; and
the plastic cover includes one or more locking features for locking with the metal support ring.

33. The electrical-power supplying product of claim 22, wherein the individual preselected-type battery further comprises a plastic label formed by a shrinkable sleeve for laterally covering the individual preselected-type battery.

\* \* \* \* \*